United States Patent Office 3,448,086
Patented June 3, 1969

---

3,448,086
ANIONIC POLYMERIZATION OF LACTAMS WITH PHOSPHONITRILIC COMPOUND AS COCATALYST
Gustave Bryant Bachman and Brage Golding, West Lafayette, and Thomas P. Murphy, Evansville, Ind., assignors, by mesne assignments, to Dart Industries Inc., Los Angeles, Calif., a corporation of Delaware
No Drawing. Filed July 2, 1965, Ser. No. 469,341
Int. Cl. C08g 20/18, 33/16
U.S. Cl. 260—78
8 Claims

ABSTRACT OF THE DISCLOSURE

Polymerizing lactams to polylactams at temperatures from 125° C.–300° C. in an anionic, substantially anhydrous system having therein a phosphonitrilic compound capable of reacting with the lactam, for example, (1) a cyclic phosphonitrilic dihalide trimer, (2) a cyclic phosphonitrilic dihalide tetramer, or (3) a mixture of (1) and (2), and polyamides stabilized against degradation and discolorization at elevated temperatures in the presence of air formed by so polymerizing lactams.

---

This invention relates to polyamides derived from lactams, to the processes by which they are prepared and to the polymerization systems from which they are prepared. More particularly, this invention relates to the base-catalyzed polymerization of lactams whereby the molecular weight distribution and/or the magnitude of the molecular weight of the polymers can be more accurately controlled and to the promotor and/or regulator employed therein. This invention also relates to certain phosphonitrilic compounds, phosphonitrilic intermediates, phosphonitrilic-containing polyamides, etc., and to polyamides stabilized against degradation and discoloration which normally occurs at elevated temperatures in the presence of air.

The reaction mechanism of base-catalyzed polymerization of lactams such as caprolactam is considerably different from the conventional aqueous polymerization of caprolactam as practiced in the commercial production of nylon 6. The aqueous polymerization involves hydrolysis of the lactam with water to form a linear amino acid, followed by condensation of the amino groups and carboxyl groups to form a linear polyamide. In contrast thereto, the base catalyzed polymerization of caprolactam is carried out in the substantially complete absence of water, without formation of amino acids. The mechanism of base-catalyzed polymerization of caprolactam is represented by the following table.

Table I (Eq. 1)

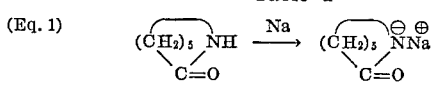

(Eq. 2)

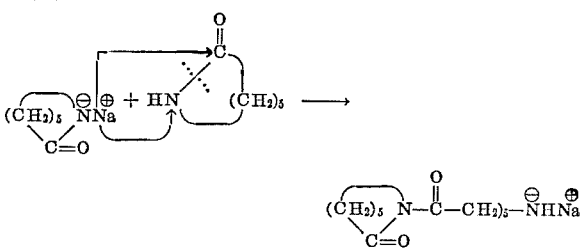

(Eq. 3)

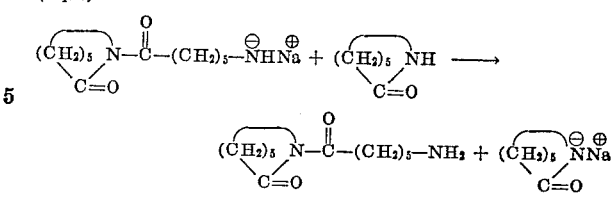

(Eq. 4)

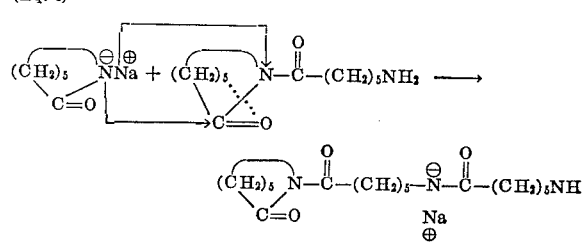

Eq. 5)

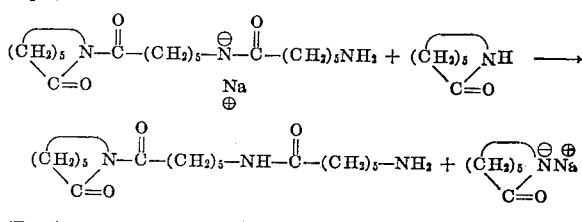

(Eq. 6)

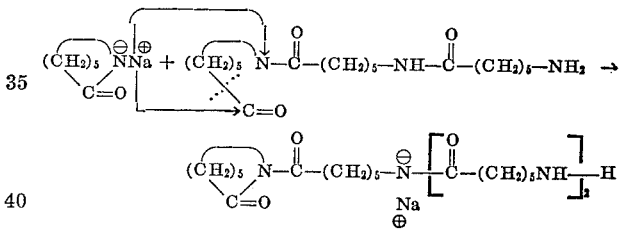

The reaction indicated by Equations 3 through 6 are continued indefinitely, the sodium atom being repeatedly transferred to a new caprolactam monomer molecule which in turn becomes attached to the polymer molecule by opening the lactam ring at the end of the polymer molecule.

Since the base catalyzed polymerization outlined above occurs at a relatively slow rate, it is desirable to accelerate its rate. This is effected by agents called "promotors" which may be defined as agents which, when used with a suitable catalyst, accelerate the rate of polymerization more than would occur with the catalyst alone. However, from a commercial viewpoint, it is desirable that the rate of polymerization should not be accelerated as to cause difficulties in the commercial processing of the polymer. Stated another way, the rate of reaction should not be too fast nor too slow, but should be controlled at a desired rate.

In most polymerization processes (including lactam polymerizations and particularly base-catalyzed polymerizations of lactams) the resulting polymerization product contains a mixture of polymer species having varying molecular weights. Consequently, the so-called molecular weight of most polymers is actually an "average" molecular weight. Under many circumstances, a mixture of polymer species having a broad distribution of molecular weights is undesirable. For example, films blown from nylons of very broad molecular weight distribution will exhibit an excessive grainy appearance, whereas those blown from nylons of narrower molecular weight distribution will be relatively clear.

Another problem in the preparation of most polymers, including polyamides, is the ability to accurately and consistently produce a polymer of predetermined average molecular weight. That is due to the fact that under many circumstances the polymerization proceeds so rapidly from the artificially induced active sites that all of the sites are not utilized to the same extent—i.e., polymer molecules of extremely high molecular weights are produced from some of the sites, leaving insufficient monomer to form equally high molecular weight molecules from the remainder of the sites. This, then, gives rise to difficulties in reproducibly controlling the average molecular weight distribution in lactam polymerization.

Average molecular weights and/or molecular weight distribution are controlled by agents known as "regulators" which may be defined as substances which control one or more aspects of reactions occurring during polymerization including the relative rates of a plurality of reactions taking place during polymerization.

In addition, polyamides (nylons) have a tendency to degrade and turn somewhat yellow or even brown in the presence of oxygen (as in air) especially when the polyamides are subjected to higher temperatures such as during molding or extrusion of the polymer or during ironing or pressing of the nylon fabrics.

We have now discovered a process of polymerizing lactams whereby the magnitude and/or distribution of the molecular weights of the resulting polyamides can be more precisely and reproducibly controlled, and the polyamide produced are more effectively stabilized against degradation and discoloration in the presence of air and heat.

In essence, these results are effected by polymerizing lactams under substantially anhydrous conditions in the presence of an alkali metal catalyst and a phosphonitrilic compound hereinafter defined.

These phosphonitrilic compounds embody the functions of both promotors and/or regulators in that both the rate of reaction and the magnitude and/or distribution of molecular weights are more effectively controlled. The resulting polymers are produced at the desired rate and present no processing difficulties due to magnitude and/or distribution of molecular weights.

The polymerization system

The polymerization system in which the present invention is carried out is the base-catalyzed polymerization of lactams. These include the lower lactams of the α-pyrrolidone and α-piperidone series for example of the formula

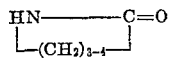

and those of the higher lactam series, such as the ϵ-caprolactam series, for example of the formula

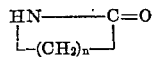

where $n$ is for example 5–18, such as 5–8, but preferably, because of its commercial importance, ϵ-caprolactam. Other species include

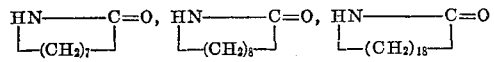

cyclic hexamethylene adipamide, etc. Lactams which are substituted o none or more of the methylene groups, for example with alkyl radicals, preferably lower alkyl radicals such as those having 1–8 carbon atoms can also be used, for example alpha-ethyl pyrrolidone, alpha-beta-dimethylpyrrolidone, methyl- ϵ-caprolactam, etc. Mixtures of lactams can also be polymerized, for example, mixtures of caprolactam and capryliclactam and mixtures of oenanthic lactam (derived from heptoic acid) and caprolactam. Copolymers are thereby obtained. Block copolymers can be prepared by adding and polymerizing the lactams in sequence, for example, by first adding caprolactam and then caprylic-lactam, etc.

In the base-catalyzed polymerization system (as distinguished, for example, from the hydrolytic polymerization system) polymerization occurs through ionization of the lactam molecule to form a lactamate anion. Thus, the terminology "base-catalyzed polymerization of lactams" refers to polymerization involving the lactamate anion and carried out under conditions in which said lactamate anion is stable.

The lactam often contains small to trace amounts of water. Although the removal of these small to trace amounts of water is not essential in order to allow polymerization to take place, the essentially complete dehydration of the lactam, such as by azeotropic distillation, produces a lactam which can be polymerized with very small amounts of catalyst and phosphonitrilic compound. For example, we have been able to polymerize caprolactam in the temperature range of 200–215° C. in about 30 minutes with $2.97 \times 10^{-2}$ mole percent of sodium hydride catalyst based on the lactam. In general, the more completely dehydrated the polymerization system, the less catalyst and phosphonitrilic compound need be employed.

The catalyst

Suitable catalysts for the base-catalyzed polymerization of this invention are any of the metals (which can be in metallic, complex ion, or compound form) which are capable of forming bases (in the "Lewis base" sense) sufficiently strong to form a lactamate salt of the lactam being polymerized. This lactamate salt is then the active catalyst of the present base-catalyzed polymerization system. Common examples of such catalysts are the alkali and alkaline earth metals (e.g., sodium, potassium, lithium, calcium, strontium, barium, magnesium, etc.), either in metallic form or in the form of hydrides, boro-hydrides, amides, alkoxides, oxides, hydroxides, carbonates, etc. In the case of compounds such as the hydroxides and carbonates, which give off water when reacted with lactams, the bulk of such water must be removed from the polymerization system for example, by the application of heat and/or reduced pressures before the base-catalyzed polymerization can take place. If such water is not removed, the required lactamate salt is not stable and hydrolytic polymerization will take place rather than base-catalyzed polymerization. Other effective catalysts are the organometallic derivatives of the foregoing metals as well as of other metals. Examples of such organo-metallic compounds are the lithium, potassium, and sodium alkyls such as butyl lithium, ethyl potassium or propyl sodium, or the aryl compounds of such metals such as sodium phenyl. Other suitable organo-metallic compounds are diphenyl magnesium, zinc diethyl, triisopropyl aluminum, diisobutyl aluminum hydride, etc.

As a general class, the materials known as Grignard reagents are effective base catalysts for the present polymerization. Typical of such Grignard catalysts are ethyl magnesium chloride, methyl magnesium bromide, phenyl magnesium bromide, and the like. Other suitable catalysts are sodium amide, magnesium amide and magnesium anilide, as well as numerous others.

The present base-catalyzed polymerization of higher lactams is generally carried out with a catalyst concentration ranging anywhere from a small fraction of 1 mole percent (e.g. 0.001%) to as much as 15–20 mole percent, based upon the quantity of monomer to be polymerized. In general, however, preferred catalyst concentrations will fall between about 0.1 mole percent and about 1 mole percent of lactam monomer.

The basic catalyst may be reacted with the lactam prior to the addition of the phosphonitrilic compounds of this invention, or the basic catalyst and the phosphonitrilic compounds may be added substantially simultaneously. Alternately, the phosphonitrilic compound can be mixed with the lactam and the basic catalyst added thereto. The resulting mixture formed by any of the above procedures is then polymerized.

The phosphonitrilic compounds

The promotors and/or regulators of this invention are phosphonitrilic compounds which are capable of reacting with lactams and/or lactamate salts to form an N-substituted lactam derivative illustrated by the following formula

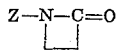

where Z is the moiety of the phosphonitrilic compound. Where more than one reactive group on the phosphonitrilic compound reacts with the lactam, one forms a lactam complex containing a plurality of lactam groups

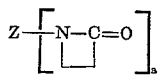

wherein $a$ is 2 or more. It may be as high as there are reactive groups on the phosphonitrilic compound, such as 2–22 or greater. It may even be higher in the case of high polymers. The phosphonitrilic derivative also acts as a promotor and/or regulator.

The phosphonitrilic compounds of this invention may be defined as compounds of the formula $ZX_a$ where Z represents the phosphonitrilic moiety, X represents groups capable of reacting with the lactam and/or a lactamate salt and $a$ represents the number of such groups which are capable of reacting with the lactam such as 1–22 or greater.

For example $ZX_a$ may represent a phosphonitrilic compound having at least one

unit where X is a halogen group. After reaction at least one N=P group is joined directly to the lactam to form a —N=P—N system. The X groups may also be other than halogen groups provided this compound contains at least one X group which is capable of reacting with the lactam such as for example alkoxy, phenoxy, thiocyanate, etc. The nature of these phosphonitrilic compounds can be best understood from a discussion of their chemistry.

When a phosphorous pentahalide, such as $PCl_5$ is reacted with an ammonium halide, such as ammonium chloride, a mixture of phosphonitrilic halides is formed. These have the general formula $(PNX_2)_n$, such as illustrated by $(PNCl_2)_n$. The value for $n$ is 3 for the trimer which is the most common form. The tetramer where $n$ is 4 is also cyclic, and is the next most common form. In addition, an oily mixture of higher polymers having for example 5–11 phosphonitrilic units is also produced. The lower members are definitely established to be cyclic while the higher members are believed to be cyclic. Higher polymers having many connected rings can also be prepared.

The formulas of the trimer $(NPCl_2)_3$ and tetramer $(NPCl_2)_4$ are as follows:

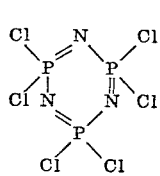 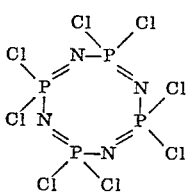

Because of its ring structure the trimer is sometimes known as "inorganic benzene."

An example of a polycyclic phosphonitrilic compound which has been separated from the reaction mixture is

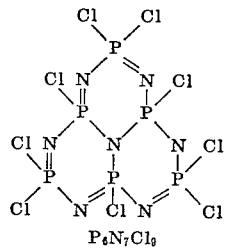

$P_6N_7Cl_9$

Although this polycyclic phosphonitrilic compound does not have the $(NPCl_2)$ formula because of its condensed structure, it can also be employed in this invention since it has at least one —N=P—Cl group.

Corresponding bromides have also been prepared by reacting $PBr_5$ with ammonium bromide. Mixed bromochlorides can be obtained by reacting $PCl_5$ with $NH_4Br$ or by reacting phosphorus chlorobromides with $NH_4Br$ or $NH_4Cl$.

Fluorides can be similarly formed by reacting $PCl_5$ with $NH_4F$ to yield $(PNF_2)_n$. Mixed fluorohalides can be formed by fluorination of phosphonitric compounds. For example, fluorinations of the trimer $(NPCl_2)_3$ or the tetramer $(NPCl_2)_4$ produce $P_4N_4F_6Cl_2$, $P_4N_4F_4Cl_4$, etc.

When $NH_4Cl$ reacts with $PCl_5$, $NH_4PCl_6$ is believed to be formed which breaks down to $NH_2PCl$ or $NH=PCl_3$ (I) which may either react with itself or with more $PCl_5$ to yield $PCl_4 \cdot N=PCl_3$ (II). These two compounds are the first members of the two series.

(I)          $H(NPCl_2)_nCl$
(II)        $PCl_4(NPCl_2)_nCl$

Higher members of these series can result from more than one condensation process involving the original reactant and intermediates. Although a compound of Series I has not been isolated, a methyl analogue has been prepared by reacting methyl ammonium chloride with $PCl_5$ to yield $CH_3(NPCl_2)Cl$.

Compounds of Series II have been prepared by reacting $PCl_5$ with an insufficient amount of $NH_4Cl$, thus not allowing the reaction to go to completion. These are in essence chain stopped phosphonitrilic polymers which can be converted to both the cyclic and/or the linear by further reaction with $NH_4Cl$.

The following are examples of known phosphonitrilic halides:

Trimeric phosphonitrilic halides

| | |
|---|---|
| $P_3N_3F$ | $P_3N_3Cl_5Br$ |
| $P_3N_3F_4Cl_2$ | $P_3N_3Cl_4Br_2$ |
| $P_3N_3F_2Cl_4$ | $P_3N_3Cl_2Br_4$ |
| $P_3N_3Cl_6$ | $P_3N_3Br_6$ |

Tetrameric phosphonitrilic halides $P_4N_4F_8$
$P_4N_4F_6Cl_2$
$P_4N_4F_4Cl_4$
$P_4N_4Cl_8$
$P_4N_4Br_8$ Pentameric phosphonitrilic halides $P_5N_5F_{10}$
$P_5N_5Cl_{10}$ Hexameric phosphonitrilic halides $P_6N_6F_{12}$
$P_6N_6Cl_{12}$ Heptameric phosphonitrilic halide $P_7N_7Cl_{14}$ Polycyclic phosphonitrilic halide $P_6N_7Cl_9$ Certain derivatives of these phosphonitrilic compounds can also be employed provided the resulting phosphonitrilic compounds are capable of reaction with the lactam and the substituted group does not interfere with the lactam polymerization.

Examples of suitable phosphonitrilic compounds where 1 or more halogen groups are replaced by other groups include thiocyanate, alkoxy, aryloxy, etc. groups.

It is known that tertiary amines, ethers, carbonyl compounds, etc. for example pyridine, quinoline, dibenzylamine, etc., dioxane, acetone, etc., form complexes of the phosphonitrilic compounds. These can be employed provided the complexing group does not interfere with lactam polymerization.

Phosphonitrilic compounds, including derivatives thereof, are described in the following publications which are incorporated by reference into the present patent application as if a part thereof:

(1) Progress in Inorganic Chemistry (Interscience Publishers, Inc. 1962), vol. 4, pp. 275–373.

(2) Chemical Week, Feb. 20, 1965, pp. 9–100.

(3) Advances in Inorganic and Radio-Chemistry (Academic Press, 1959) vol. 1, pp. 348–383; and elsewhere.

In summary, the term "phosphonitrilic compound" as employed herein means a compound containing at least one —N=P—X unit which is capable of reacting with the lactam and/or the lactamate salt to form a complex which is capable of polymerizing or causing polymerization in the manner of this invention. The X group should be capable of reacting with the lactam and/or the lactamate salt to form an N-substituted derivative which is capable of polymerizing or causing polymerization in the manner of this invention. The phosphonitrilic compound may be linear or cyclic. Preferably it is a cyclic compound wherein the X's are halogen and most preferably chlorine. This phosphonitrilic compound reacts to form an activating group which has a

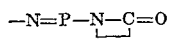

system.

The phosphonitrilic compounds of the present invention are employed in concentrations ranging from a small fraction of one mole percent (e.g. 0.001%) to as much as 15–20 mole percent based on quantity of monomer to be polymerized. In general, however, preferred concentrations will fall between about 0.1 mole percent and about 1 mole percent of lactam monomer.

As is quite evident, many other phosphonitrilic compounds of the present invention are known of will be constantly developed which would be useful in our invention. It is, therefore, not only impossible to attempt a comprehensive catalogue of such compositions but to attempt to describe the invention in its broader aspects in terms of specific chemical names used would be too voluminous and unnecessary since one skilled in the art could by following the description of the invention herein select a useful phosphonitrilic compound. This invention lies in the use of suitable phosphonitrilic compounds in the polymerization of lactams and their individual compositions are important only in the sense that their properties can affect this function. To precisely define each specific useful phosphonitrilic compound in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific phosphonitrilic compounds suitable for this invention by applying them in the process set forth herein. In analogy to the case of a machine, wherein the use of certain materials of construction or dimensions of parts would lead to no practical useful result, various materials will be rejected as inapplicable where others would be operative. We can obviously assume that no one will wish to use a useless phosphonitrilic compound in the present system nor will be misled because it is possible to misapply the teachings of the present disclosure to do so. Thus, any phosphonitrilic compound that can perform the functions stated herein (ie., as promoter and/or regulator) can be employed.

In general, the polymerization can be carried out over a wide temperature range, for example at a temperature high enough to melt the lactam monomer but low enough to prevent degradation of the resulting polymer. Lower temperatures tend to both minimize the reaction of Equation 2, Table I, on one hand, which decreases the number of polymerization reaction centers, and promote the polymerization sustaining reaction of Equation 4, Table I, on the other hand, so as to produce a higher molecular weight polymer with a narrower molecular weight distribution. Stated another way, the molecular weight of the polymer will vary inversely with the number of polymer molecules in the composition. The selection of the particular operating temperatures is a balance between a desirably short overall reaction time and a desirably high molecular weight and low molecular weight distribution. We have carried out our process at temperatures of from about 125° or lower to 270° C. or higher, such as from 150° to 250° C., for example from 175° to 225° C., but preferably from 190° to 215° C. Reaction times of a few minutes to several hours or more can be employed.

The polymerization is generally carried out under an inert atmosphere such as under nitrogen, or the like to minimize oxidation and color formation.

There are numerous other incidental benefits which result from the rapidity and ease with which the present polymerization proceeds at relatively low temperatures. For example, plasticizers can be dissolved or otherwise incorporated into the monomer and will be more uniformly distributed through the resulting polymer. Likewise, polyblends can be prepared by dissolving or otherwise distributing another polymer (e.g., polystyrene) into the lactam monomer before polymerization. Glass fibers can also be incorporated into the monomer, dispersed, and following polymerization, yield a polymer in which the fibers are well dispersed and thoroughly "wetted" by the polymer, resulting in improved physical properties. Volatile blowing agents can be incorporated into the monomer, which is polymerized at a temperature below the boiling point or decomposition temperature of the blowing agent; subsequent heating of the polymer to a higher temperature (above the softening point of the polymer) will give a uniformly foamed polymer mass. Insoluble pigments can be incorporated into the monomer, which can then be polymerized before any substantial settling of the pigment takes place. Likewise, soluble dyes can be incorporated into the monomer. Because the polymerization can be carried out so rapidly at temperatures below the softening point of the resulting polymer, the present process is highly suitable for polymerization of polymer in predetermined shapes or forms. Centrifugal polymerization-casting of objects such as pipe or tubing is particularly feasible. The foregoing polymerization-casting type of operation is enhanced by the fact that there is a very slight shrinkage of polymer during polymerization, thereby causing the molded object to pull away from the mold and facilitate removal from the mold without cooling.

The present polymerization can be carried out by any of the conventional procedures, such as by mass polymerization, solution polymerization or suspension polymerization. In general the bulk of the polymerization reaction (e.g., 90% or higher conversion of monomer to polymer) is generally completed within a few minutes. Additional time of 15–30 minutes to 1–2 hours or longer may be allowed to complete the reaction.

It is believed that the polymerization of the lactam according to this invention proceeds in the manner described in Table I except that the phosphonitrilic compound combines with the lactamate anion to form the phosphonitrilic lactam complex in accordance with the following equation where caprolactam is employed to illustrate general reaction.

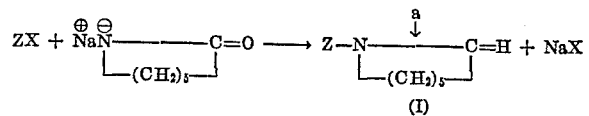

(I)

which product is an activated molecule. Activation at $a$ is believed due to the nitrogen atom being between the phosphonitrilic group ($-N=P-$) and the carbonyl group forming a uniquely activated system. Activation continues as a result of the formation of the following

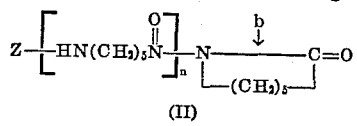

(II)

which contains the bond $b$ which is activated to the addition of the lactam by the nitrogen being between two carbonyl groups. These may be illustrated with the trimer $(NPCl_2)_3$:

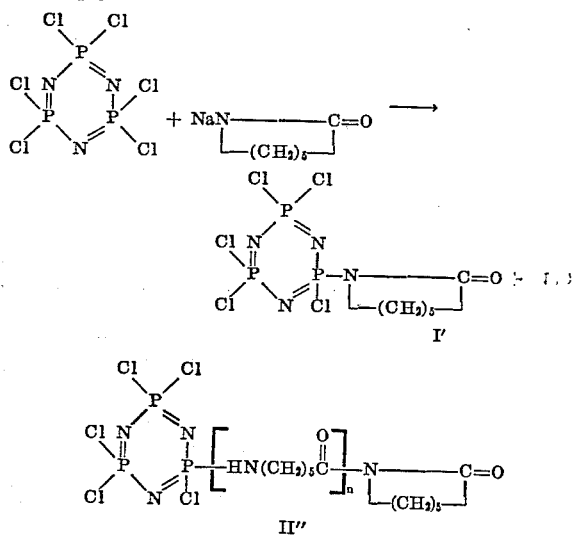

Where more than one halogen reacts, the phosphonitrilic group will be attached to a plurality of lactam groups or polymer units resulting from such lactam groups. For example, where two halogens react, the lactam derivative may be as follows:

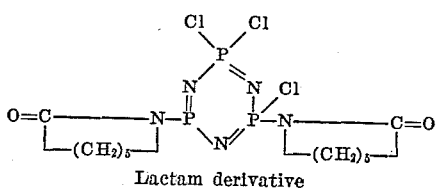

Lactam derivative

Where additional chlorine groups react, additional lactam or polymer units will be attached to the phosphonitrilic compound. Thus, where a plurality of halogens are reacted, it is obvious that polymers of higher molecular weights are obtained since the phosphonitrilic compound joints a plurality of polymer chains.

The cyclic trimer and tetramer, or mixtures thereof, are the preferred species.

It is to be noted that the terminal amino groups is not a primary group because of the substitution of the phosphonitrilic group. It is believed that its thermal oxidative stability is due primarily to this blocking.

It will be noted that the base catalyzed polymerization involves consecutive reactions of two different general categories (1) opening a lactam ring between an acyl group and a tertiary nitrogen atom to which is attached a phosphonitrilic group and (2) opening a lactam ring between an acyl group and a tertiary nitrogen atom to which is also attached a second acyl group. Since a primary amino group results from only the reaction involving the secondary nitrogen atom (Table I, Equations 2 and 3) and the phosphonitrilic compound reacts in the manner indicated above, the polymerization will proceed to give a polymer free of primary amino end groups which polymer is more stable to thermal-oxidative degradation and discoloration.

Because of the commercial importance of caprolactam and because of the commercial availability of the cyclic trimer, tetramer, or mixtures of both trimer or tetramer, these reactants are employed in all the examples. Any method of bringing the reactants together can be employed. Since the trimer, tetramer and caprolactam are solids and the preferred method is bulk polymerization, the polymerization is carried out in a molten state. For convenience a 50% mineral oil dispersion of NaH is employed.

By one method of caprolactam and the phosphonitrilic chloride (preferably finely ground) are intimately mixed at room temperature, heated to a molten state under nitrogen and NaH then added. This mixture is then heated to polymerization temperature, for example from 125°–275° C. although the polymerization is preferably carried out at 175–225° C. Higher temperatures up to 300° C. or higher have also been employed although polymerization temperatures of 200° C. ± 20° are generally employed.

Alternately, caprolactam, NaH, and the phosphonitrilic compound mixed at room temperature and then heated to the temperature at which polymerization takes place.

Alternatively, caprolactam and NaH may be intermittently mixed, heated to a molten state and the phosphonitrilic compound added thereto. Thereupon the mixture is heated to the temperature at which polymerization takes place.

Stated another way, the components of the polymerization system may be brought together in any manner or order. However, at polymerization temperatures it is highly desirable that all components be in intimate contact with each other so that polymerization can proceed smoothly.

One method of achieving intimate contact is to mix intimately caprolactam and the phosphonitrilic chloride at room temperature and then heat this mixture to a molten

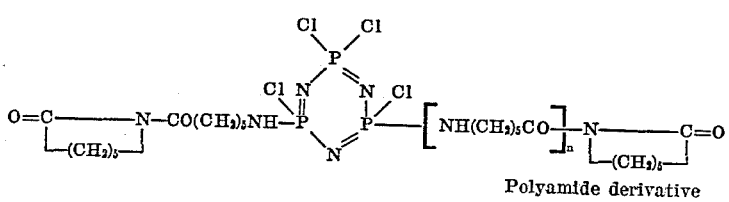

Polyamide derivative state. NaH is then intimately mixed into the system.

Another method is to handle all components in a molten state so that caprolactam, the phosphonitrilic chloride and NaH are all mixed in a liquid state in order that the disadvantages of handling solids be avoided.

Another method is to handle the phosphonitrilic chloride as an intimate solution in caprolactam. This molten solution is then polymerized by adding NaH thereto and heating to polymerization temperature.

A very convenient method of obtaining intimate contact of components during polymerization is to bubble nitrogen through the molten mass during polymerization.

The following examples are presented for purposes of illustration and not of limitation.

EXAMPLE 1

The following components were placed in a reaction vessel and melted at 80° C. under nitrogen (M means mole):

|  | Grams |
|---|---|
| (1) Caprolactam (0.25001 M) | 28.2917 |
| (2) $(NPCl_2)_3$ (cyclic trimer) (0.00200 M/M of (1)) | 0.1738 |
| (3) NaH dispersion (0.02040 M/M (total)) 50% in mineral oil (0.00840 M/M (2)) | 0.2446 |

Note that enough NaH was added to give equimolar amounts of Na$^+$ and Cl$^-$ and still give 0.008 M/M concentration of NaH as a catalyst.

When melting occurred, the nitrogen tube was placed on the bottom of the molten mass and nitrogen gas allowed to bubble through so as to enhance the rate of melting. This produced good mixing action and during polymerization enhanced uniform polymerization.

After melting, the reaction vessel was heated to 200° C. for polymerization. Within 6 minutes the mixture was extremely viscous. Additional heating for another hour produced polymer conversions in excess of 97%.

EXAMPLE 2

The process of Example 1 was repeated except that the following system was employed:

| | |
|---|---|
| (1) Caprolactam (0.25000 M) _____g__ | 28.2909 |
| (2) $(NPCl_2)_{3-4}$ (Mixed cyclic trimer and tetramer) (0.00200 M/M (1)) _____g__ | 0.1886 |
| (3) NaH dispersion (0.02128 M/M (total)) 50% in mineral oil (0.00826 M/M (2)) | 0.2556 |

Polymerization proceeded as in Example 1 with similar caprolactam conversions.

EXAMPLE 3

The process of Example 1 was repeated except that the following system was employed:

|  | Grams |
|---|---|
| (1) Caprolactam (0.25000 M) | 28.2902 |
| (2) $(NPCl_2)_4$ (cyclic tetramer) (0.00201 M/M (1)) | 0.2330 |
| (3) NaH dispersion (0.02440 M/M (total)) 50% in mineral oil (00832 M/M (2)) | 0.2927 |

Polymerization proceeded as in Example 1 with similar caprolactam conversions.

EXAMPLE 4

The following components were mixed together at room temperature:

| | |
|---|---|
| (1) Caprolactam _____lbs__ | 5.0 |
| (2) NaH dispersion (50% in mineral oil) __gms__ | 48.48 |
| (3) $(NPCl_2)_{3-4}$ (mixed trimer-tetramer) __gms__ | 30.16 |

This mixture was then heated to a temperature of 265–270° C. under nitrogen until it became molten. Heating was continued and the mixture became extremely viscous within seven minutes after becoming molten. Heating was continued for an additional hour to yield a 98% conversion to the polymer.

EXAMPLE 5

The following components were mixed together at room temperature:

| | |
|---|---|
| (1) Caprolactam _____lbs__ | 5.00 |
| (2) NaH dispersion (50% in mineral oil) __gms__ | 26.24 |
| (3) $(NPCl_2)_{3-4}$ _____gms__ | 15.08 |

Polymerization was carried out in the manner of Example 4 with similar conversions.

EXAMPLE 6

The following components were mixed and melted at 80° C.

| | |
|---|---|
| Caprolactam _____gms__ | 28.29 |
| NaH dispersion (50% in mineral oil) ____gms__ | 0.60 |

Thereupon 0.19 gms. of $(NPI_2)_{3-4}$ was added and the mixture heated to 265–270° C. under nitrogen. Within three minutes the mixture became extremely viscous. Heating was continued for an additional 60 minutes to yield a 98% conversion to the polymer.

EXAMPLE 7

The following components were mixed at room temperature:

| | |
|---|---|
| (1) Caprolactam _____lbs__ | 5.0 |
| (2) $(NPCl_2)_{3-4}$ _____gms__ | 15.04 |
| (3) NaH dispersion (50% in mineral oil) __gms__ | 22.48 |

Polymerization was carried out in the manner of Example 4 with similar conversions.

EXAMPLE 8

The following components were mixed and melted under nitrogen at 80° C.

|  | Grams |
|---|---|
| (1) Caprolactam | 28.2 |
| (2) NaH dispersion (50% in mineral oil) | 1.42 |
| (3) $(NPCl_2)_{3-4}$ 1/100 M(3) to M(1) | 0.94 |

This mixture was then heated to 260–265° C. under nitrogen and became extremely viscous within two minutes. Heating was continued for an additional hour to yield a 98% conversion to the polymer.

EXAMPLE 9

The process of Example 8 was repeated except that the following components were employed with similar results:

|  | Grams |
|---|---|
| (1) Caprolactam | 28.2 |
| (2) NaH dispersion (50% in mineral oil) | 0.80 |
| (3) $(NPCl_2)_{3-4}$ (1/250 M(3) to M(1)) | 0.37 |

EXAMPLE 10

The process of Example 8 was repeated except that the following components were employed with similar results:

|  | Grams |
|---|---|
| (1) Caprolactam | 28.2 |
| (2) NaH dispersion (50% in mineral oil) | 0.60 |
| (3) $(NPCl_2)_{3-4}$ (1/500 M(3) to M(1)) | 0.10 |

EXAMPLE 11

The following components were employed:

|  | Grams |
|---|---|
| (1) Caprolactam | 28.2 |
| (2) NaH dispersion (50% in mineral oil) | 1.08 |
| (3) $(NPCl_2)_{3-4}$ | 0.942 |

The $(NPCl_2)_{3-4}$ was melted under nitrogen and while being maintained at 200° C. the caprolactam and NaH previously made molten at 80° C. were added to the $(NPCl_2)_{3-4}$ and heating was continued until it became extremely viscous. Heating was continued for an additional hour to yield a 98% conversion.

EXAMPLE 12

The following components were polymerized in the manner of Example 11 with similar results.

(1) Caprolactam _____ lbs__ 5.0
(2) $(NPCl_2)_{3-4}$ (1/1000 M/M (1)) _____ gms__ 7.02
(3) NaH dispersion (50% in mineral oil) ___gm__ 15.24

With the above specific illustrations and by following the same or similar procedures, one can polymerize other lactams including: pyrrolidone, piperidone, caprylic lactam, oenathic lactam, mixtures of any of these,, etc. Block units of any of these can be prepared by following the above procedures except that sequential additions of different lactams are employed.

One of the advantages of our invention is the production of polyamides such as a polymer of caprolactam which will not be easily degraded. To measure the resistance of the polymer to degradation, a series of tests are conducted in which the polymer was cut into chunks, ground, and molded. Its tensile strength is measured, and then the polymers cut into chunks, ground again and remolded. This procedure is repeated until the polymer has been molded a total of three times with its tensile strength being measured after each molding operation. Based on these tests, the polyamides of this invention maintain their tensile strength thus indicating their stability and resistance to degradation.

One advantage of our polymerization system is its ability to be stored for extended periods of time without polymerization. Thus, the polymerization system of monomer, catalyst and the phosphonitrilic compound can be blended prior to use and stored at low temperatures such as below about 100° C., but preferably below 75° C. until ready for use with obvious commercial advantages.

Although the phosphonitrilic compounds function in the manner of promotors and/or regulators, they may also be employed in conjunction with other promotors and regulators, for example those disclosed in U.S. Patents 3,017,391, 3,017,392 and elsewhere, which patents are by reference, incorporated into the present application as if part hereof.

The polymers obtained herein, both extracted or unextracted, are eminently suited for all purposes for which polyamides are normally used such as in the products of film, fibers, threads, wire, injection mouldings or other shaped articles, foils, thin coatings, on metal articles, in conjunction with fillers such as glass fibers, for example, in the manner of U.S. Patents 2,877,501, British Patents 618,094, 950,656 and the like.

As many apparently widely different embodiments may be made without departing from the spirit and scope thereof, it is apparent that we do not limit ourselves to the specific embodiments described herein.

Having thus described our invention what we claim as new and desire to obtain by Letters Patent is:

1. A process of polymerizing lactam at temperatures from 125° C.–300° C. in an anionic, substantially anhydrous system consisting essentially of lactam, anionic catalyst and phosphonitrilic compound promoter capable of reacting with the lactam.

2. The process of claim 1 wherein the lactam is caprolactam.

3. The process of claim 1 wherein the phosphonitrilic compound phosphonitrilic promoter contains at least one

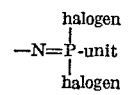

4. The process of claim 3 wherein the lactam is caprolactam.

5. The process of claim 3 wherein the phosphonitrilic compound promoter is selected from the group consisting of $[(NPX_2)_3, (NPX_2)_4$ and $(NPX_2)_{3-4}]$ (1) 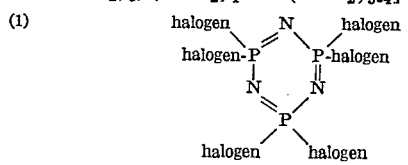

(2) 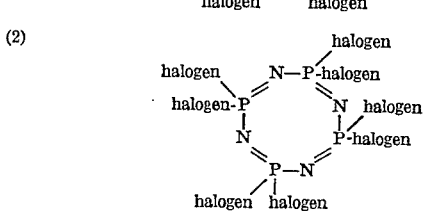

and (3) a mixture of (1) and (2).

6. The process of claim 5 wherein the lactam is caprolactam.

7. The process of claim 5 wherein the halogen is chlorine.

8. The process of claim 7 wherein the lactam is caprolactam.

References Cited

UNITED STATES PATENTS

| | | | |
|---|---|---|---|
| 2,241,321 | 5/1941 | Schlack | 260—78 |
| 3,017,391 | 1/1962 | Mottus et al. | 260—78 |
| 3,344,087 | 9/1967 | Becke et al. | 260—2 |
| 3,345,340 | 10/1967 | Brouns | 260—78 |

FOREIGN PATENTS

| | | |
|---|---|---|
| 1,493,154 | 7/1967 | France. |

HAROLD D. ANDERSON, *Primary Examiner.*

U.S. Cl. X.R.

260—2.5, 37, 857; 264—311